United States Patent [19]

Propster

[11] 4,311,502

[45] Jan. 19, 1982

[54] WET SCRUBBING-PELLETIZING METHOD

[75] Inventor: Mark A. Propster, Gahanna, Ohio

[73] Assignee: Owens-Corning Fiberglas Corporation, Toledo, Ohio

[21] Appl. No.: 201,641

[22] Filed: Oct. 27, 1980

[51] Int. Cl.³ .............................................. C03B 5/16
[52] U.S. Cl. .................................... 65/27; 65/134; 55/95; 55/222; 55/256; 261/114 JP
[58] Field of Search ..................... 55/93–95, 55/222, 99, 244, 255, 256, 269, 228; 34/169, 168, 79; 65/134, 27; 23/313; 261/114 JP

[56] References Cited

U.S. PATENT DOCUMENTS

| 2,070,578 | 2/1937 | Bowman ................................. 55/223 |
| 2,238,824 | 4/1941 | Ryner .................................... 55/239 |
| 2,853,281 | 9/1958 | Hibshman ....................... 261/114 JP |
| 3,991,480 | 11/1976 | Menge ...................................... 34/79 |
| 4,184,861 | 1/1980 | Erickson et al. ....................... 65/134 |
| 4,238,217 | 12/1980 | Stepanek et al. ..................... 65/134 |

FOREIGN PATENT DOCUMENTS 514864  6/1974  Japan ..................................... 55/89

Primary Examiner—Bernard Nozick
Attorney, Agent, or Firm—Ronald C. Hudgens; Philip R. Cloutier; Robert F. Rywalski

[57] ABSTRACT

A closed-loop method for removing particulates from a hot gases passed in contact with pellets to dry them. The hot gases after pellet contact are passed through an aqueous scrubbing zone and to atmosphere. The aqueous solution is thereafter introduced into the pelleting means.

12 Claims, 1 Drawing Figure

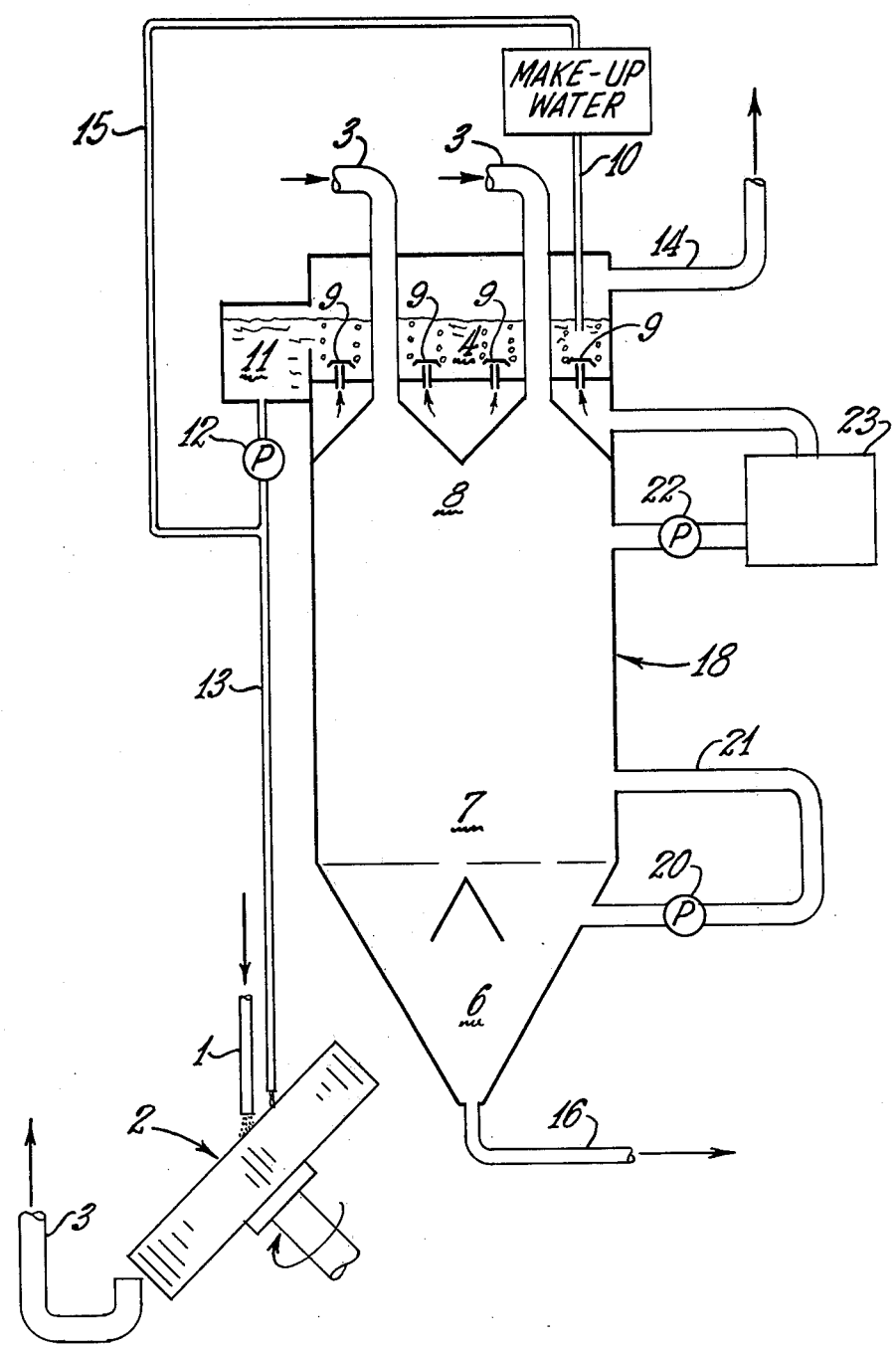

WET SCRUBBING-PELLETIZING METHOD

BACKGROUND OF THE INVENTION

This invention pertains to a method of reducing atmospheric contamination by particulate handling processes.

In one of its more specific aspects, this invention relates to a method of reducing emissions of gaseous and particulate matter from pellet forming operations.

In many processes, it is customary to charge particulate matter to a furnace wherein the particulate matter is melted and then further processed. In such processes, it is advantageous to preheat the charge, but its particulate nature makes such preheating difficult. It has, therefore, been found advantageous to form pellets of the particulates and preheat the pellets prior to their introduction into the furnace. While such a procedure results in a considerable reduction in particulate emissions to the atmosphere, attrition of the pellets can still result in dust and chemicals being emitted in undesirable quantities.

There now has been developed a process by means of which not only are dust emissions significantly reduced, but a significant proportion of the chemical constituents of the particulate matter is also reclaimed.

While the process of this invention will be described in terms of pelleting and preheating batch materials for charging to furnaces which melt batch for the subsequent production of glass fibers, the invention is applicable to any pelleting and pelleting preheating system in which hot gases, from any source, are passed in heat exchange with the pellets.

STATEMENT OF THE INVENTION

According to this invention, there is provided a process for reducing the gaseous and particulate emission contained in gases discharged from a pellet drying and preheating system which comprising pelletizing particulate matter in a pelletizing zone in contact with an aqueous medium, introducing the pellets into heat exchange with hot gases to entrain particulate matter in the hot gases, passing the particulate-containing hot gases in contact with water in a scrubbing zone to form an aqueous composite and passing the composite to the pelletizing zone.

Also, in accordance with this invention, there is provided pelletizing means, a counter-current contactor adapted for the introduction of hot gases and of pellets from the pelletizing means, a water scrubbing zone adapted for entrance of water and of hot gases from the contactor thereinto and for exit of washed gases therefrom and means for transfering water from the scrubbing zone to the pelletizer.

In various embodiments of this invention, some portion of the water from the scrubing zone is recycled back into the inlet water to the scrubbing zone.

DESCRIPTION OF THE INVENTION

The invention will be more easily understood if explained in conjunction with the attached FIGURE which is a schematic flow diagram of the invention.

Referring thereto, there is shown conduit 1 through which batch to be pelletized is introduced into pelletizer 2. Any batch which can be pelletized can be employed.

Pelletizer 2 can be any suitable type pelletizer capable of pelletizing glass batch with water or an aqueous solution, which aqueous solution can contain pelletizing agents and various chemical components, such as oxides of iron, oxides of sulfur, sodium boron oxides, and the like, which are absorbed by the water in the wet scrubbing zone.

The newly-formed, or green, pellets are transferred by conduit 3 into the pellet dryer and preheater system 18 in which counter-current contact is made between the pellets introduced thereinto and hot gases. These hot gases are introduced upwardly into the system counter-current to the downward flow of the pellets.

While the various zones concerned with the treatment of the pellets according to this invention can be positioned in a plurality of vessels, they will be described herein as being positioned in super-imposed positions in a single vessel.

The hot gases are introduced near the bottom of vessel 18 and rise counter-currently to the descending pellets introduced through conduit 3. In the lowest, or volatile collection zone 6, the hot gases and the pellets both are at their highest temperature and volatiles are transferred from the hot gases to the pellets. As the gases proceed upward, they enter the pellet preheating zone 7 and, subsequently, pellet drying zone 8. In pellet preheating zone 7, the pellets, after being dried in zone 8, are, for the first time, contacted in a relatively water-free state with the hot gases.

From the pellet preheating zone 7, the hot gases pass into contact with the pellets in the pellet drying zone 8. Here the contact between the hot gases and the pellets dries the pellets by removing a principal portion of their moisture.

The hot gases from the pellet drying zone then pass into the wet scrubbing zone 4 in which the previously mentioned contact is made between the aqueous solution and the hot gases. This scrubbing zone will be designed to maximize gas to liquid contact by containing packing, such as Raschig rings, or contact means, such as bubble plates 9, the latter being shown for purpose of illustration. The height of the packing or the number of bubble plates employed will depend, in part, on the allowable pressure drop of the hot gases passing through this zone and the degree of contact required.

To improve particulate contact and collection, flocculating agents can be introduced into the scrubbing water. However, any additive so introduced must not be detrimental to the finished glass chemistry.

Relatedly, in order to enhance any reaction which takes place between the aqueous scrubbing solution and the condensibles in the effluent gas, various factors can be controlled such as pH and solution temperature. In addition, chemical additives such as CaO and Ca(OH)$_2$ can be introduced into the aqueous scrubbing solution to react with boron compounds or to provide seeds for crystal growth sites, etc.

Make-up water to the wet scrubbing zone is introduced through conduit 10 and withdrawn therefrom through water regulator 11 which governs the depth of submergence of the bubble caps. Withdrawn water is introduced into pump 12 from which it can be routed through conduit 13 to the pelletizer and a portion recycled through conduit 15 into the make-up water line to the scrubber.

To further facilitate the effectiveness of the wet scrubbing zone, water can be sprayed into the gaseous zone above the liquid level, or a combination of water and air can be introduced below the liquid level, but above the bubble-caps and counter-currently to the upward gas flow to further knock particulates out of the gas phase and into the aqueous phase.

The gases from the wet scrubbing zone leave that zone through conduit 14. Hot pellets leave the system through conduit 16 from which they can be charged to the furnace. The gas will be appreciably reduced in particulate content.

Various modifications can be made to the system as described. For example, some portion of the hot gases can be by-passed around portions of selected zones, for example, by the installation of gas pump 20 and conduit 21. Similarly, some portion of the hot gas can be withdrawn from a zone by pump 22, heated or cooled by exchanger 23 and returned to the same zone or to another zone, or bypassed completely.

Typical operating conditions for the system might be as follows:

| Temperatures, °F. | Hot Flue Gases | Pellets |
|---|---|---|
| Inlet to Wet Scrubbing Zone, | 200-400 | 70-100 |
| Outlet from Wet Scrubbing Zone | 150-250 | 70-100 |
| Inlet to Pellet Drying Zone | 600-1000 | 70-100 |
| Outlet From Pellet Drying Zone | 200-600 | 220-950 |
| Inlet to Volatile Collection Zone | 1300-1500 | 950-1250 |
| Outlet from Volatile Collection Zone | 1000-1300 | 1250-1450 |
| Rates | | |
| Water to Wet Scrubbing Zone, GPH | 0-100 | — |
| Batch to Pelletizer, #/HR | — | 2400-2800 |
| Water to Pelletizer, GPH | — | 50-60 |
| Exhaust Gases to Atmosphere, SCFM | 7000-8000 | — |
| Pellets to Furnace, #/HR | 1300-1500 | 1300-1500 |
| Gases to Pellet Hopper, SCFM | 1300-1400 | — |

It will be evident from the foregoing that various modifications can be made to this invention. Such, however, are considered within the scope of the invention.

I claim:

1. A process for reducing particulate content in gases discharged from a pellet preheating system which comprises forming pellets of particulate matter in a pelletizing zone in contact with an aqueous solution, passing the pellets in a contact zone in counter-current contact with hot gases to dry and preheat the pellets and to cool the gases and to entrain particulate matter in the gases, passing the gases in contact with a liquid in a liquid contact zone to remove gaseous and particulate matter from said gases and to form an aqueous solution and introducing said aqueous solution into said pelletizing zone.

2. The method of claim 1 in which the preheated pellets are introduced into a glass production furnace.

3. The method of claim 1 in which said counter-current contact is done in a plurality of zones in which the pellets are preheated and dried and volatiles are transferred from the pellets to the hot gases.

4. The method of claim 1 in which a portion of said aqueous solution is introduced into said liquid contact zone.

5. The method of claim 1 in which a portion of said hot gases are removed from said contact zone, cooled and reintroduced into said contact zone.

6. The process of claim 1 in which said aqueous solution comprises oxides of iron, oxides of sulfur and sodium boron oxide.

7. The process of claim 1 in which said liquid in said liquid contact zone contains a chemical additive.

8. The process of claim 1 in which said liquid in said liquid contact zone contains a flocculating agent.

9. The process of claim 1 in which the pH of said liquid in said liquid contact zone is controlled.

10. The process of claim 1 in which the temperature of said liquid in said liquid contact zone is controlled.

11. The process of claim 1 in which water is introduced into the gaseous zone above the liquid in said liquid contact zone.

12. The process of claim 1 in which water and air are introduced into the gaseous zone into the liquid in said liquid contact zone.

* * * * *